United States Patent [19]

Ewest et al.

[11] Patent Number: 4,635,570

[45] Date of Patent: Jan. 13, 1987

[54] ARRANGEMENT FOR VITRIFYING RADIOACTIVE LIQUID WASTE

[75] Inventors: Eckhart Ewest, Balen; Gustav Mertens; Helmut Straschewski, both of Mol, all of Belgium

[73] Assignee: Deutsche Gesellschaft für Wiederaufarbeitung von Kernbrennstoffen mbH, Hanover, Fed. Rep. of Germany

[21] Appl. No.: 725,391

[22] Filed: Apr. 22, 1985

[30] Foreign Application Priority Data

Apr. 21, 1984 [DE]   Fed. Rep. of Germany ....... 3415198

[51] Int. Cl.⁴ ................................................. F23G 7/00
[52] U.S. Cl. ........................................ 110/237; 65/27; 65/335; 110/215; 110/238
[58] Field of Search ............... 110/215, 216, 237, 238, 110/165 R, 342; 432/72; 414/165; 65/27, 335

[56]   References Cited

U.S. PATENT DOCUMENTS

| 4,119,395 | 10/1978 | Hatanaka et al. | 65/335 X |
| 4,135,904 | 1/1979 | Suziki et al. | 65/335 X |
| 4,139,360 | 2/1979 | Piper | 65/335 X |
| 4,176,163 | 11/1979 | Nelson | 65/27 X |
| 4,208,201 | 6/1980 | Ryeck | 65/27 |
| 4,225,332 | 9/1980 | Tsey | 65/335 X |

FOREIGN PATENT DOCUMENTS 198916 12/1982 Japan ..................................... 110/237
190800 11/1983 Japan ..................................... 110/342

*Primary Examiner*—Albert J. Makay
*Assistant Examiner*—Steven E. Warner
*Attorney, Agent, or Firm*—Walter Ottesen

[57]   ABSTRACT

The invention is directed to an arrangement for vitrifying highly radioactive waste solutions. The arrangement has a glass melting furnace and a wet scrubber for scrubbing particles of dust out of the offgas from the glass melting furnace. The offgas is passed from the glass melting furnace into the wet scrubber through an offgas conduit. The solids in the offgas are deposited in the offgas conduit. In order to counteract the disadvantageous consequences of such deposits, the offgas conduit includes two conduit lengths. The glass melting furnace is connected to one end of a first one of the conduit lengths via a connecting conduit stub mounted on the melting furnace and the wet scrubber is connected to one end of the second conduit length via a connecting conduit stub on the scrubbers. The two conduit lengths extend upwardly and are inclined toward each other so that they interconnect at their respective other ends. The drop throughout the entire offgas conduit is sufficeint to inhibit the accumulation of dust deposits therein. The vertical connecting conduit stub of the glass melting furnace is provided with an external cooling means in the region where it passes through the top of the furnace thereby keeping deposits soft and loose so that they can drop back into the glass melting furnace.

6 Claims, No Drawings

ARRANGEMENT FOR VITRIFYING RADIOACTIVE LIQUID WASTE

FIELD OF THE INVENTION

The invention relates to an arrangement for vitrifying highly radioactive waste solutions having a glass melting furnace and a wet scrubber for scrubbing out dust particles from the offgas of the glass melting furnace. The offgas is passed from the glass melting furnace into the wet scrubber through an offgas conduit connecting the furnace to the scrubber.

BACKGROUND OF THE INVENTION

The vitrification of highly radioactive waste solutions is a tried and tested technology for putting such substances into solid form. The vitrification process is fed by two streams of material. One stream of material comprises the base glass, also referred to as the frit, while the second stream of material is highly radioactive nitric acid waste solution. The highly radioactive waste solution dries on the hot surface of the molten bath in the glass melting furnace. Under the effect of heat, the waste products which are present in the form of nitrates are converted into oxides and are fused, that is, they are chemically embedded in the base glass.

During known vitrification of highly radioactive liquid wastes in a ceramic melting furnace, offgases are produced which are passed to an offgas section. The first component of the offgas section is a wet scrubber, the purpose of which is to substantially remove solid matter from the offgases. A wet scrubber of this kind is disclosed, for example, in German published patent application DE-OS No. 32 05 536 which corresponds to pending United States patent application entitled "Apparatus for Scrubbing Dust Particles from the Offgases of a Nuclear Facility" having Ser. No. 466,926 and filed on Feb. 16, 1983.

The melting furnace and the wet scrubber are disposed in side-by-side relationship within a shielded cell which is referred to as the hot cell. They are connected together by a horizontal offgas conduit for carrying the offgas. It has now been found that the offgas conduit becomes blocked in operation after a certain period of time due to the aerosol-bearing and dust-bearing offgases from the glass melting operation. The solids as well as evaporation products from the glass melting operation result in deposits in the offgas conduit. In the course of time, these deposits accumulate and constrict the internal cross section thereof so that the flow of offgas therethrough is impeded.

Another disadvantageous phenomenon was found to occur in the portion of the horizontal offgas conduit which is disposed in the wall of the furnace, which is usually of a multi-layer or laminar construction. The multi-layer construction of the wall of the furnace comprises an inner layer of refractory and corrosion-resistant ceramic furnace shell blocks, heat-insulating layers adjoining the same, and a steel containment vessel which encloses the heat-insulating layers. It was found that under certain operating conditions, it is possible that, in the portion of the horizontal offgas conduit in the wall of the furnace, the dry powder which is deposited therein severely crusts and partially fuses to the inside wall surface of the conduit because of the high level of radiant heat acting thereon.

Heretofore, the horizontal offgas conduit had to be dismantled for the purposes of cleaning the same and removing the deposited or encrusted material. Because of the radioactivity in the shielded cell, the operation of dismantling the offgas conduit can only be carried out with remote manipulation and is therefore a complicated operation.

The attempt was also made to gain access to the interior of the offgas conduit and to remove the internal deposits thereon by an apparatus which is passed through the wet scrubber. Because of the radioactivity in the shielded cell, this operation can only be carried out by remote manipulation. The technical effort here is considerable because access in this way to the offgas conduit is very difficult.

It has already been proposed that it should be made more difficult for dust and other solids to be deposited in the offgas conduit by generating a gas carpet or layer at the inside wall surface of the conduit. An offgas conduit which is provided with a gas carpet in that way does in fact retain its free cross section for a longer period of time; however, after a certain period of time, this conduit too becomes clogged and has to be mechanically cleaned by remote manipulation or replaced by a remote handling operation. In addition, a high level of expenditure is involved in maintaining the gas carpet required. Furthermore, the necessary gas flow would put a high loading on the entire offgas system and especially on the $NO_x$-scrubber.

SUMMARY OF THE INVENTION

It is an object of the invention to provide an arrangement of the kind referred to above wherein the protection of the offgas conduit against encrustation and the formation of inner deposits is substantially improved. It is a further object of the invention to provide such an arrangement which can be more simply disassembled and/or cleaned.

The arrangement for vitrifying highly radioactive solutions includes a glass melting furnace for acting upon the solution to be vitrified wherein an offgas with dust particles entrained therein is generated and a wet scrubber for washing dust particles from the offgas. The arrangement of the invention further has an offgas conduit which includes two offgas conduit lengths. The glass melting furnace is connected to an end of a first one of the conduit lengths and the wet scrubber is connected to an end of the second conduit length. The connections to the furnace and wet scrubber are made at respective vertical connecting conduit stubs mounted therein. The conduit lengths are arranged to extend upwardly in such a way that they are inclined towards each other and pass through each other with their respective upper ends.

By virtue of the arrangement according to the invention, the furnace offgases are no longer passed horizontally from the glass melting furnace to the wet scrubber as heretofore, but are first passed vertically upwardly through the top of the furnace, are then ducted upwardly in the first conduit length at an angle inclined towards the wet scrubber, are reversed in direction at the point at which the two conduit lengths communicate and pass through each other, and are then ducted downwardly to the gas scrubber at the same angle of inclination. The furnace offgases are ducted perpendicularly into the wet scrubber through the vertical connecting conduit means provided thereat. A sufficient drop is ensured throughout the offgas conduit to make it difficult for larger solids to form deposits therein. It was found that simply mechanically knocking the conduit length can already result in deposits being satisfactorily loosened, with the deposits then dropping into the glass melting furnace or the wet scrubber because of the gradient of the offgas conduit lengths.

If the offgas conduit has to be dismantled for cleaning purposes after a longer period of operation, the offgas conduit arrangement according to the arrangement of the invention makes it easier for the offgas conduit to be dismantled. The offgas conduit is disconnected at its two ends which are connected, respectively, to the vertical connecting terminals of the glass melting furnace and the wet scrubber. The offgas conduit then only has to be removed in a vertically upward direction by means of a crane. This dismantling operation is substantially simpler than the operation of dismantling a horizontally mounted offgas conduit when viewed in the context of remote manipulation requirements.

In an advantageous embodiment of the invention, the ends of the two intersecting conduit lengths pass through each other and are provided with removable blank flanges. If, after a longer period of time, the offgas conduit should become clogged, it can be made accessible to suitable cleaning equipment by removing the blank flanges. For example, a spiral of corresponding configuration can be passed through the openings of the offgas lengths and the deposits can then be removed; because of the gradient of the offgas conduit lengths, the deposits do not remain lying in the offgas conduit lengths but drop either into the glass melting furnace or into the wet scrubber. This maintenance operation makes it unnecessary to disassemble the entire offgas conduit.

According to another advantageous embodiment of the invention, a down conduit which can be charged with additive materials opens into the conduit length leading to the glass melting furnace. The down conduit is charged, for example, with glass beads which correspond to the chemical composition of the base glass. At regular intervals of time, the glass beads are taken from a storage container and passed by means of a metering device, through the down conduit, into the conduit length which communicates with the furnace, and pass into the glass melt because of the gradient of the conduit. While they pass through the conduit length leading into the glass melting furnace, deposits on the inside wall surface of the conduit length are removed by the friction of the glass beads.

Another advantageous embodiment of the invention provides that the vertical connecting means of the glass melting furnace is provided with external cooling means in the region of the pass-through extending through the top wall of the furnace. The offgas connecting conduit stub, which projects through the top wall of the furnace and which represents the vertical connecting means which connects to the offgas conduit length, has a lower degree of corrosion because of the cooling action. The solid materials are prevented from fusing in that region of the offgas conduit. The deposits remain substantially soft and loose and either drop back into the glass melting furnace or are returned to the glass melting furnace by the cleaning apparatus or the additive materials.

The offgas conduit is kept substantially free from internal deposits by the arrangement according to the invention, or the internal deposits can be removed in a simple manner because there is always a sufficient drop over the entire run of the offgas conduit length. The distance covered by the offgas is approximately three times longer than the distance covered in the arrangements used heretofore wherein the offgas is ducted horizontally. For this reason, cooler offgas passes into the wet scrubber in the arrangement of the invention and therefore causes a lower level of corrosion in that piece of equipment. The invention provides for easy dismantling of the offgas conduit by virtue of the ease of accessibility from above which is very advantageous when viewed in the context of remote manipulation.

BRIEF DESCRIPTION OF THE DRAWING

The drawing is a schematic of the arrangement according to the invention for vitrifying highly radioactive waste solutions.

DESCRIPTION OF THE PREFERRED EMBODIMENTS OF THE INVENTION

A ceramic glass melting furnace 1 is made up of a multi-layer wall. The side walls, top of the furnace and base thereof all have, as an inner layer, ceramic melting blocks or bricks 3 which are surrounded by a heat-insulating intermediate layer 5. The entire glass melting furnace 1 is enclosed so as to be gas-tight by a steel enclosure 7.

An opening 9 is formed through the top of the furnace. A vertical conduit stub 11 having an upper end with a connecting flange 13 is introduced into the opening 9. The conduit stub 11 is surrounded by a cooling jacket 15.

A wet scrubber 17 is disposed laterally of the glass melting furnace 1 and has a collecting vessel 19. Two partitioning walls 21 and 23 extend transversely through the vessel 19. The lower partitioning wall 23 is secured to the bottom of the vessel 19 and partitions the vessel 19 into two liquid compartments 25 and 27. The upper partitioning wall 21 is mounted to the cover 29 of the housing and projects perpendicularly into the compartment 27. The upper partitioning wall 21 is arranged at a spacing from the partitioning wall 23 and projects downwardly beyond the upper end thereof.

A scrubbing column 31 is vertically mounted above the vessel 19 and is connected at its lower end via a conduit 33 to the vessel 29 in the region of compartment 27 of the latter. The discharge line 35 for the cleaned offgas is mounted at the head end of the scrubbing column 31.

On housing cover 29, the vessel 19 has a perpendicularly extending connecting conduit stub 37 which is connected via flange 39 to a connecting flange 41 of an offgas conduit 43. The other end of the offgas conduit 43 is also secured with a flange 45 to the vertical connecting conduit stub 11 of the glass melting furnace 1. The offgas conduit 43 includes two conduit lengths 47 and 49 which are inclined with respect to the vertical. The conduit lengths 47 and 49 are inclined towards each other and pass through each other at their upper ends so as to cause the interiors of the conduit lengths to communicate with each other. The intersection of the conduit lengths is indicated by reference numeral 61. The openings at the upper ends of the two conduit lengths 47 and 49 are closed off by blank flanges 51 and 53.

A down conduit 55 opens at branch 63 into the upper region of the conduit length 49 which leads to the furnace. The down conduit 55 is connected to a metering device 57 for glass beads 58 which are fed into the down conduit 55 from a supply container 59.

The operation of the above-described arrangement will now be described.

The offgas leaves the ceramic melting furnace 1 through the vertical water-cooled offgas connecting conduit stub 11 which passes through the top wall of the furnace. The offgas is ducted upwardly in the conduit length 49 which is provided with a bend and is inclined away from the furnace at an angle of 45° with respect to the vertical. At the point of intersection 61 of the two conduit lengths 47 and 49, the offgas is diverted downwardly through 90° and is ducted with a 45° drop down to the wet scrubber 17. There, it passes into the vessel 19 of the wet scrubber 17 through the vertical connecting conduit stub 37.

The cooling of the vertical offgas conduit stub 11 in the top of the glass melting furnace 1 prevents solid particles from being baked or fused thereon. Almost all offgas solid particles are deposited on the wall surface of the conduit length 49 in the form of a loose powder in the flow path to the branch 63. The offgas is already substantially cooled down as it passes over the entire flow path to the wet scrubber 17.

The two mutually inclined conduit lengths 47 and 49 of the offgas conduit 43 and the two vertical connecting conduit stubs 11 and 37 at the furnace and wet scrubber, respectively, each afford a sufficient drop for transporting the solid particles either into the furnace 1 or into the wet scrubber 17.

Glass beads 58 are introduced into the down conduit 55 by the metering device 57 from time to time. The glass beads introduced in this manner drop downwardly through the conduit length 49 because of the gradient thereof, and into the glass melting furnace, onto the surface 65 of the molten glass therein. As the glass beads pass through the conduit length 49, they loosen any deposits on the inside wall surface of the conduit by frictional action.

It has been found that no relevant dust deposit or the presence of deposited matter could be detected in the conduit length 47 which is inclined downwardly toward the wet scrubber 17, even after a prolonged period of furnace operation.

If the exhaust conduit 43, however, should clog up after an even longer period of operation, the deposits on the interior thereof can be removed, after the blank flanges 51 and 53 have been opened, by means of the spiral members or cleaning scrapers of suitable configuration. When the deposits are removed in this way, because of the gradient of the two conduit lengths 47 and 49, they drop into the glass melting furnace 1, or into the wet scrubber 17.

It is understood that the foregoing description is that of the preferred embodiments of the invention and that various changes and modifications may be made thereto without departing from the spirit and scope of the invention as defined in the appended claims.

What is claimed is:

1. Arrangement for vitrifying highly radioactive liquid waste comprising:
   a glass melting furnace for acting upon the liquid waste to be vitrified and wherein an offgas with dust particles entrained therein is generated;
   a wet scrubber for washing dust particles from the offgas;
   a first conduit length communicating at one end thereof with said glass melting furnace;
   a second conduit length communicating at one end thereof with said wet scrubber;
   said first and second conduit lengths extending upwardly and being inclined toward each other;
   said conduits being interconnected at the respective locations thereof remote from said one ends so as to permit the offgas from said furnace to travel upwardly through said first conduit length along which a portion of said dust particles are deposited and then downwardly to said wet scrubber through said second conduit length along which a further portion of said dust particles are deposited; and,
   said first and second conduit lengths being inclined to define respective gradients sufficient to permit said particles to drop into corresponding ones of said furnace and said set scrubber thereby inhibiting the formation of deposits of dust particles in said conduit lengths.

2. The arrangement of claim 1, comprising feed means for feeding materials into the upper end of said first conduit length thereby dislodging any of the deposited dust particles which have not fallen into said furnace.

3. Arrangement for vitrifying a highly radioactive liquid waste comprising:
   a glass melting furnace for acting upon the liquid waste to be vitrified and wherein an offgas with dust particles entrained therein is generated;
   a wet scrubber for washing dust particles from the offgas;
   a first conduit length communicating at one end thereof with said glass melting furnace;
   a second conduit length communicating at one end thereof with said wet scrubber;
   said first and second conduit lengths extending upwardly and being inclined toward each other;
   said conduits being interconnected at the respective locations thereof remote from said one ends so as to permit the offset from said furnace to travel upwardly through said first conduit length and downwardly through said second conduit length to said wet scrubber thereby inhibiting the formation of deposits of dust particles in said conduit lengths; and,
   first and second vertical connecting conduit stubs mounted in said furnace and said scrubber, respectively, said first connecting conduit stubs being connected to said one end of said first conduit length and said second connecting conduit stub being connected to said one end of said second conduit length.

4. The arrangement of claim 3, comprising cooling means for cooling said first vertical connecting stub thereby keeping dust deposits soft and loose so that they can drop back into said glass melting furnace.

5. Arrangement for vitrifying a highly radioactive liquid waste comprising:
   a glass melting furnace for acting upon the liquid waste to be vitrified and wherein an offgas with dust particles entrained therein is generated;
   a wet scrubber for washing dust particles from the offgas;
   a first conduit length communicating at one end thereof with said glass melting furnace;
   a second conduit length communicating at one end thereof with said wet scrubber;
   said first and second conduit lengths extending upwardly and being inclined toward each other;
   said conduits being interconnected at the respective locations thereof remote from said one ends so as to permit the offgas from said furnace to travel upwardly through said first conduit length and downwardly through said second conduit length to said wet scrubber thereby inhibiting the formation of deposits of dust particles in said conduit lengths; and, said first and second conduit lengths having respective other ends defining respective openings, the arrangement further including end closure caps covering said openings and being adapted so as to be temporarily removable to permit cleaning said conduit lengths.

6. Arrangement for virtrifying a highly radioactive liquid waste comprising:

a glass melting furnace for acting upon the liquid waste to be virtrified and wherein an offgas with dust particles entrained therein is generated;

a wet scrubber for washing dust particles from the offgas;

a first conduit length communicating at one end thereof with said glass melting furnace;

a second conduit length communicating at one end thereof with said wet scrubber;

said first and second conduit lengths extending upwardly and being inclined toward each other;

said conduits being interconnected at the respective locations thereof remote from said one ends so as to permit the offgas from said furnace to travel upwardly through said first conduit length and downwardly through said second conduit length to said wet scrubber thereby inhibiting the formation of deposits of dust particles in said conduit lengths; and, feed means for feeding materials into said first conduit length, said feed means including: a down conduit communicating with said first conduit length at a location beneath the intersection of said first and second conduit lengths; and, metering means for metering said materials into said down conduit.

* * * * *

UNITED STATES PATENT AND TRADEMARK OFFICE
CERTIFICATE OF CORRECTION

PATENT NO. : 4,635,570

DATED : January 13, 1987

INVENTOR(S) : Eckhart Ewest et al

It is certified that error appears in the above-identified patent and that said Letters Patent is hereby corrected as shown below:

On the first page of the patent, after the Abstract, delete "No Drawings" and substitute -- 1 Drawing -- therefor.

In the Abstract, line 15: delete "scrubbers." and substitute -- scrubber. -- therefor.

In the Abstract, line 19: delete "sufficeint" and substitute -- sufficient -- therefor.

In column 4, line 45: delete "vessel 29" and substitute -- vessel 19 -- therefor.

In column 6, line 37: delete "offset" and substitute -- offgas -- therefor.

In column 7, line 15: delete "virtrifying" and substitute -- vitrifying -- therefor.

In column 7, line 18: delete "virtrified" and substitute -- vitrified -- therefor.

Signed and Sealed this

Eighth Day of September, 1987

Attest:

DONALD J. QUIGG

*Attesting Officer*         Commissioner of Patents and Trademarks